United States Patent Office 2,940,270
Patented June 14, 1960

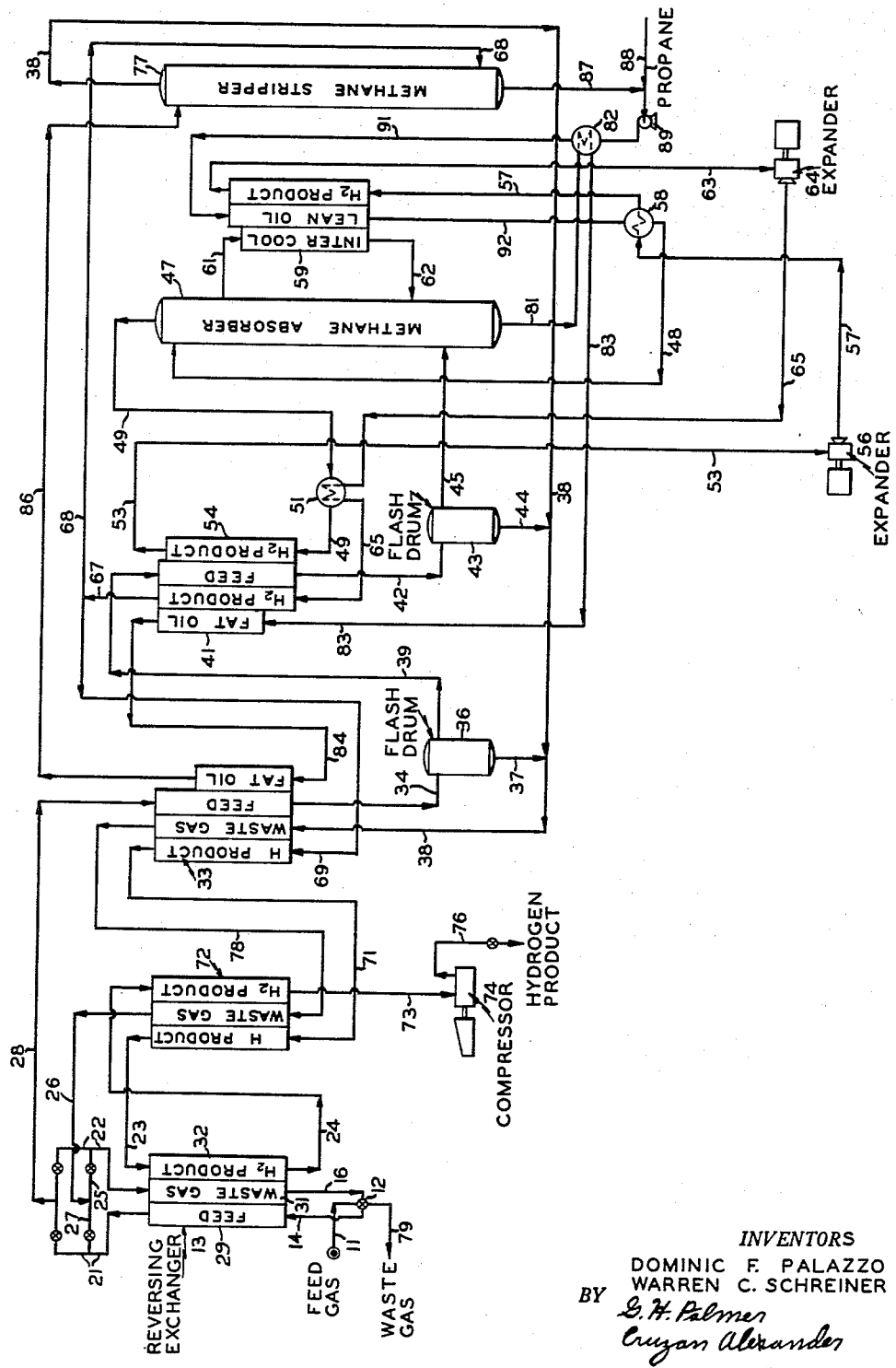

2,940,270

GAS SEPARATION

Dominic F. Palazzo, Brooklyn, and Warren C. Schreiner, Franklin Square, N.Y., assignors to The M. W. Kellogg Company, Jersey City, N.J., a corporation of Delaware Filed July 2, 1956, Ser. No. 595,277

5 Claims. (Cl. 62—17)

This invention relates to a low temperature gas separation process. In one aspect, this invention relates to a method for cooling fluid streams in which a first fluid stream is cooled to the temperature of a second stream or below.

This application is a continuation-in-part of S.N. 548,631 which was filed on November 23, 1955.

In many processes such as those involving low temperature fractionation or separation of various components from mixtures of gases and/or liquids, it is desired to cool an incoming feed stream to a suitable temperature for the separation or fractionation operation. Such cooling may be accomplished with the use of auxiliary refrigerants but it is preferred to avoid the use of such refrigerants wherever possible. The use of all or a portion of one or more of the products of the process to provide the necessary cooling duty for cooling the incoming feed sufficiently is very desirable in this respect. Our invention provides an improved method for utilizing all or a portion of the product in this manner.

It is an object of this invention to provide an improved process for cooling fluid streams.

It is also an object of this invention to provide an improved process for cooling fluid streams in which a first fluid stream is to be cooled to the temperature of a second fluid stream or below and wherein the necessary cooling duty is obtained from the second fluid stream.

Another object of this invention is to provide an improved process for the separation of hydrogen and/or methane from mixtures containing the same.

A further object of this invention is to provide an improved low temperature process for the recovery of hydrogen from mixtures of hydrogen and hydrocarbons.

Another object of this invention is to provide an improved process for partially condensing and cooling a first gaseous stream to the temperature of a second gaseous stream or below in which the necessary cooling duty is supplied by the second gaseous stream.

It is a further object of this invention to provide an improved process for utilizing all or part of the products of a process for the low temperature separation or fractionation of mixtures of gases and/or liquids to cool said mixtures to the desired separation or fractionation temperature.

Other objects and advantages will become apparent to those skilled in the art from the following description and disclosure.

According to one aspect of our invention, a first fluid stream is cooled by the process which comprises passing a cooled second stream at a pre-expansion pressure in indirect heat exchange with said first fluid stream. The second fluid stream is then cooled by expanding it and is passed at a post-expansion pressure and temperature in indirect heat exchange with the second fluid stream which is at the pre-expansion pressure to provide the initial cooled second stream. The second fluid stream at the post-expansion pressure is then passed in indirect heat exchange with the first fluid stream.

It can be seen that by using our invention the second fluid stream need not be expanded prior to its first passage in indirect heat exchange with the first fluid stream. This is made possible by first cooling the second fluid stream to a sufficiently low temperature by indirect contact with the same material which has been cooled by expansion. The second fluid stream is preferably cooled to about 5 to about 20° F. below the temperature to which it is desired to cool the first fluid stream. When the second fluid stream is expanded following its first passage in heat exchange with the first fluid stream, it is preferably expanded sufficiently so that its temperature is sufficiently low so that after it has been used to cool the unexpanded second fluid stream its temperature will still be from about 5 to about 20° F. below the temperature to which it is desired to cool the first fluid stream. The second fluid stream is preferably in the gaseous state while the first fluid stream is preferably in the gaseous state prior to being cooled but may be condensed wholly or in part, by the cooling process. The second fluid stream may contain some liquid but should normally be predominately gaseous in order that it may be cooled sufficiently by expansion.

In practicing our invention, the first fluid stream may be at any pressure while the second fluid stream may be initially at any pressure sufficiently high so that it may be expanded sufficiently to be cooled sufficiently for use in accordance with our invention. Preferably, superatmospheric pressures are used throughout when operating in accordance with our invention.

In a preferred embodiment, our invention is used in processes for the recovery of hydrogen from mixtures containing the same.

There is a growing demand in industry for large quantities of relatively pure hydrogen. Such processes as making alcohols from esters or aldehydes, amines from nitriles and cycloparaffins from aromatics as well as reduction of ores or catalysts, synthesis of ammonia etc., all require large amounts of relatively pure hydrogen which must be obtained at the lowest possible cost. In addition, hydrogen is used in the upgrading of cycle oils by hydrogenation and under some circumstances low cost, relatively pure hydrogen is preferred for use in this type of process in preference to the relatively impure hydrogen normally used.

With the advent of catalytic reforming, a potentially large and cheap source of hydrogen has become available. Many catalytic reforming processes such as platinum reforming, produce large quantities of hydrogen-containing gases as by-products. Unfortunately, the hydrogen-containing gases produced in such processes usually contain considerable quantities of methane and heavier hydrocarbons which must be removed if sufficiently pure hydrogen is to be obtained for the uses mentioned above.

One method of recovering hydrogen from such mixtures of hydrogen and hydrocarbons is to lower the temperature of the mixture so that the hydrocarbons condense. The condensed hydrocarbons are then easily removed. Cooling and removing condensed hydrocarbons is effective to a certain extent; however, some methane always remains and, for many applications, this methane must be removed if hydrogen of a desired degree of purity is to be obtained. If the hydrogen-methane mixture is cooled to temperature just above the freezing point of methane, about 2 to about 10 mol percent, more usually about 2 to about 6 mol percent, methane usually remains uncondensed because of the methane partial pressure. Since, for many applications, hydrogen having a purity of 99 mol percent or more is desired, it is frequently necessary to remove this residual methane in order to obtain hydrogen of the required degree of purity. In order to remove this residual methane by condensation it would be necessary to cool the hydrogen and methane mixture to below the freezing point of methane and under these circumstances considerable difficulty would be experienced in removing the deposits of solid methane which would be formed. The residual methane may be more conveniently removed by scrubbing the hydrogen-methane mixture with a liquefied stream of normally gaseous hydrocarbon such as propane for removal of the methane therefrom. In a preferred embodiment, our invention is used in connection with such a process to reduce the temperature of the feed stream to the temperature at which the final removal of residual methane takes place.

According to this preferred embodiment of our invention, feed gas entering the process is first cooled by indirect contact with waste gas product and hydrogen product in a reversing heat exchanger. In the reversing heat exchanger used, two passageways are provided through which the feed and waste gas product stream are passed in countercurrent heat exchange, the feed and waste gas streams being passed through the passageways alternately in time cycles. Since it is desired to obtain hydrogen product uncontaminated by the impurities which are acquired by the waste gas stream flowing through the reversing heat exchanger, the reversing heat exchanger is provided with three passageways. The feed and waste gas streams are passed in reversing heat exchange through two of the passageways, while the hydrogen product stream is passed continuously through the third passageway in countercurrent heat exchange with the feed stream.

The heat exchanger is employed in the reversing arrangement described above in order to clear the equipment of materials deposited from the feed gas being cooled. Since the feed, which contains water vapor, is cooled in this exchanger to below the freezing point of water, deposits of ice accumulate on the heat exchange surfaces and must be removed periodically to prevent plugging of the passageways through which the feed gas passes. The time cycles for the alternate flow of feed and waste gas streams in the reversing heat exchanger are arranged to stop the flow of feed prior to the accumulation of deposits of ice in amounts effective to obstruct the passageways through which the feed passes. The feed stream is then diverted to the other passageway of the exchanger and the cooling waste gas stream passes through the passageway containing the accumulation of deposits of ice to revaporize such deposits and thus remove them from the apparatus as part of the waste gas stream. The waste gas stream thus acts as both a cooling medium and a scavenging medium in that the passage of the waste gas stream in reversing heat exchange with the feed stream serves both to cool the feed stream and to clear the equipment of ice deposited during the cooling of the feed stream. Meanwhile, the feed gas stream is cooled and caused to deposit additional material on the surfaces of the passageway previously traversed by the waste gas stream. Since the waste gas stream is used as the scavenging medium, it is unnecessary to remove from it the water scavenged from the apparatus. The direction of flow in either heat exchange passageway is reversed as a result of the interchange of passageways between the reversing streams but each of the gaseous streams undergoing reversal always flows through the heat exchange zone in the same direction, first in one passageway and then in the other.

In recovering hydrogen according to this preferred embodiment of our invention, the temperature of the waste gas stream approaching the reversing heat exchanger is sufficiently low so that, if it were allowed to flow promptly into the reversing heat exchange zone, the temperature differential between the feed stream and the waste gas stream would be so great that deposits of ice could not be removed at the same rate at which they were formed.

In order to avoid plugging of the reversing heat exchange passages with ice due to this excessive temperature difference the waste gas and hydrogen product streams are warmed before passing into the reversing heat exchanger. This is conveniently accomplished by first passing them in countercurrent heat exchange with warmed hydrogen product which has already passed through the third passage of the reversing heat exchanger. In this way the hydrogen product stream is cooled slightly just prior to being removed from the system and the cooling streams of waste gas and hydrogen product are warmed so that they enter the reversing heat exchanger at temperatures sufficient so that the waste gas stream can remove the ice deposits in the reversing heat exchange passageways at the same rate at which they are formed.

After the feed gas passes from the reversing heat exchanger, it is passed to another heat exchanger wherein it is cooled sufficiently to condense most of the $C_2$ and heavier hydrocarbons. Part of the cooling duty necessary to accomplish this may be obtained by passing the feed in countercurrent heat exchange with cold waste gas and hydrogen product streams. Part may also be supplied by the absorption medium which has been used to absorb methane from the hydrogen-methane mixture.

The $C_2$ and heavier hydrocarbons which are condensed in this heat exchange zone are separated from the feed stream by any suitable separation means such as a separation drum and are withdrawn and combined with the waste gas stream.

The feed stream is then passed to another heat exchange zone where it is cooled sufficiently to condense the remaining $C_2$ and heavier hydrocarbons and also as much methane as possible. The hydrocarbons condensed in this heat exchange zone are withdrawn and combined with the waste gas stream and the remaining feed material comprising mostly hydrogen contaminated with some methane is passed to an absorption zone where residual methane is absorbed by an absorption medium. The cooling duty for this heat exchange zone is supplied by cold hydrogen product in accordance with our invention. Part of the cooling duty may be also supplied by the cold absorption medium containing absorbed methane.

Since it is desired to cool the feed stream to a temperature substantially equal to or slightly below that of the cold hydrogen product withdrawn from the absorption zone, hydrogen product which has been withdrawn from the absorption zone is cooled and then passed in indirect heat exchange with the feed stream. This hydrogen product is then expanded to cool it to a suitable temperature and is again passed in indirect heat exchange with the feed stream. Prior to being passed in indirect heat exchange with the feed stream for the second time, the expanded hydrogen product is used to cool the hydrogen product stream withdrawn from the absorption zone before this latter hydrogen product stream is passed in indirect heat exchange with the feed stream. In this way it is possible to cool the feed stream to a temperature substantially equal to or slightly below that of the hydrogen product stream leaving the absorption zone by passing the feed stream in indirect heat exchange with two separate streams of hydrogen product, one of said streams being the hydrogen product stream which has been withdrawn from the absorption zone and cooled by heat exchange with expanded hydrogen product and the other of said streams being the expanded hydrogen product which is first used to cool the first of said streams of hydrogen product. Any suitable apparatus may be used for absorbing the methane from the hydrogen feed stream in the absorption zone but countercurrent contact in an absorption tower is usually preferred. The feed entering the absorption zone usually comprises hydrogen and about 2 to 10 mol percent methane. In the absorption zone sufficient methane is usually removed so that hydrogen product contains about 90 to 100 mol percent, preferably about 95 to 100 mol percent hydrogen. The hydrogen product from the absorption zone is used to cool the feed stream as previously discussed. It may also be desirable to utilize the hydrogen product to cool the absorption medium prior to its use in the absorption zone. One way of accomplishing this is to contact the absorption medium with hydrogen product which has been expanded to lower its temperature. In this way, the absorption medium may be reduced to substantially the same or a lower temperature than the temperature of the hydrogen product leaving the absorption zone. The hydrogen product which is used for this purpose may be hydrogen product which has already been used to supply some cooling in the heat exchange zone in which most of the methane is condensed from the feed stream. In this case, the hydrogen product exiting from that heat exchange zone is expanded and then passed in indirect heat exchange relationship with the absorption medium in order to cool the absorption medium sufficiently for use in the absorption zone. The hydrogen product may then be further expanded in order to lower its temperature sufficiently so that it may be used to cool hydrogen product coming from the absorption zone and further used to cool the feed stream as previously described.

The absorption medium containing absorbed methane is warmed by indirect heat exchange with absorption medium coming from the stripping zone or by indirect heat exchange with the feed stream or both and then passes to a stripping zone where a portion of the hydrogen product is used to remove the absorbed methane. The hydrogen product used in the stripping zone is preferably withdrawn from the remainder of the hydrogen product after the hydrogen product stream is passed through the heat exchange zone in which most of the methane is condensed from the feed. This is done in order to secure hydrogen having the proper temperature for use in the stripping zone since it is usually desirable to operate the stripping zone at a somewhat higher temperature than the absorption zone. That portion of the hydrogen product which is used to strip methane from the absorption medium becomes the waste gas stream when it leaves the stripping zone and together with the methane and heavier hydrocarbons which have been condensed and separated from the feed stream as previously discussed, comprises the waste gas stream which is used to supply cooling duty in the previously discussed heat exchange zones. The remainder of the hydrogen product is used to supply cooling duty in the various heat exchange zones as previously discussed before being recovered from the system. The absorption medium leaving the stripping zone is relatively free from methane and, after cooling to a suitable temperature by indirect heat exchange with hydrogen product and/or colder absorption medium, may be returned to the absorption zone for further use in absorbing methane.

Removal of methane by absorption from the gaseous mixture containing hydrogen and methane is normally accomplished at temperatures of about −257 and −296° F., more usually about −275 to about −295° F. Temperatures below the boiling point of methane at the absorption pressure are preferred since it is usually both possible and desirable to remove considerable quantities of methane by condensation prior to absorbing the residual methane with the liquid, normally gaseous hydrocarbon. On the other hand, temperatures below the freezing point of methane are preferably avoided due to the difficulties of handling solid methane deposits. Pressures of about 100 to about 500 p.s.i.g. for the absorption step are preferably maintained.

In general, any normally gaseous hydrocarbon which is in the liquid state is suitable for use in absorbing methane. Under the operating conditions normally used, propane, propylenes, ethane, and ethylene are suitable in this respect. Propane is usually preferred because of its low freezing point and cost. Methane is, of course, not suitable.

Removal of absorbed methane from the absorption medium in the stripping zone is preferably carried out at temperatures of about −180 to about −255° F., more usually about −200 to about −240° F. The temperature in the stripping zone should not, of course, be high enough to cause substantial vaporization of the absorption medium. In the use of the preferred embodiment described above, the feed gas stream and the hydrogen product stream prior to expansion are preferably maintained at pressures between about 100 and about 500 p.s.i.g. The hydrogen product is preferably expanded only enough to obtain the desired temperature drop. The pressure of the hydrogen product following expansion is preferably superatmospheric because of the difficulty and expense of maintaining subatmospheric pressures and of maintaining the purity of the hydrogen product if it is expanded to subatmospheric pressures.

In the practice of the preferred embodiment of our invention described above, the initial temperature of the hydrogen product is preferably about −290 to about −260° F. while the temperature to which it is desired to cool the feed is between about 0 and about 10° F. lower than that of the hydrogen product. In order to supply the necessary cooling duty to the feed, the hydrogen product used for this purpose is preferably first cooled to between about 5 and about 20° F. lower than the temperature to which it is desired to cool the feed prior to being passed in indirect heat exchange with the feed. Following its initial contact with the feed, the hydrogen product is expanded sufficiently to lower its temperature to preferably between about 5 and about 20° F. below the temperature to which it is desired to cool the hydrogen product at pre-expansion pressures. This expanded hydrogen product is used to cool unexpanded hydrogen product as described above and is then again passed in indirect heat exchange with the feed. The temperature of the hydrogen product passing in indirect heat exchange with the feed is in each case preferably at least 5° F. less than the temperature of the feed at any given point in the heat exchange zone in order to allow efficient heat exchange to take place. The temperature of the hydrogen product entering the heat exchange zone in each instance is preferably lower than the temperature to which it is desired to cool the feed.

For a better understanding of our invention, reference should be had to the accompanying drawing which is a diagrammatic illustration in elevation of a suitable arrangement of apparatus for carrying out a preferred embodiment of our invention.

In the drawing, 10,040 pounds per hour of naphtha reformer gas having the composition shown in Table I enter as feed through conduit 11 at a pressure of 135 p.s.i.a., and a temperature of 100° F.

TABLE I

*Composition of feed gas*

|  | Mol percent |
| --- | --- |
| $H_2$ | 83.60 |
| $CH_4$ | 6.33 |
| $C_2$ hydrocarbons | 4.69 |
| $C_3$ hydrocarbons | 4.15 |
| $C_4$ and heavier hydrocarbons | 0.48 |
| $H_2S$ | 0.05 |
| $H_2O$ | 0.70 |
|  | 100.00 |

The feed passes through valve 12 into a reversing heat exchanger 13 through conduit 14. In exchanger 13 feed passing through passageway 29 is cooled to a temperature of −55° F., by indirect countercurrent heat exchange with waste gas passing through passageway 31 and hydrogen product passing through passageway 32. The feed stream enters exchanger 13 through valve 12 and conduit 14 and leaves through conduits 21 and 28.

The waste gas steam obtained as explained below, enters exchanger 13 through conduit 26, conduit 25 and conduit 22 and leaves through conduit 16 and valve 12 and the hydrogen product enters exchanger 13 through conduit 23 and leaves through conduit 24. Valve 12 is designed so that the feed stream from conduit 11 may be passed to either conduit 14 and passageway 29 or conduit 16 and passageway 31 while the waste gas stream is always passed to conduit 79 regardless of whether it has passed through passageway 29 and conduit 14 or passageway 31 and conduit 16. The feed and waste gas streams are not allowed to mix at any time.

Due to the cooling effect of the hydrogen product and waste gas streams, the water which is contained in the feed is deposited in passageway 29 as ice. Before these deposits of ice build up sufficiently to interfere with the proper operation of the heat exchanger, the paths of the feed and waste gas are reversed so that the waste gas passes through passageway 29 and the feed passes through passageway 31. This reversal is accomplished by passing the feed stream from valve 12 through conduit 16 to passageway 31 and allowing it to leave exchanger 13 through conduits 22 and 28. At the same time, the waste gas passes through conduit 26, conduit 27, and conduit 21 to passageway 29 and then leaves the exchanger through conduit 14. During this period of reversed flow the ice previously deposited in passageway 29 is evaporated by the waste gas now flowing through passageway 29, while at the same time new deposits of ice are being formed by the passage of the feed stream through passageway 31. In this way, by periodically reversing the flow of the feed and waste gas streams, deposits of ice sufficiently large to interfere with the proper operation of the heat exchanger are prevented.

After the feed steam is cooled and contained water is removed in exchanger 13, the feed stream passes through conduit 28 to a heat exchanger 33. In exchanger 33 the feed is cooled to a temperature of $-200°$ F., by indirect countercurrent heat exchange with cold hydrogen product and waste gas streams. Part of the cooling duty in the cold end of exchanger 33 is also supplied by propane which has been used to absorb residual methane from the hydrogen product. From exchanger 33 the feed passes through conduit 34 to a separator drum 36 in which the hydrocarbons condensed by the cooling of the feed in exchanger 33 are separated. The separated hydrocarbons, having the composition shown in Table II, are withdrawn from separator drum 36 through conduit 37 and are combined with the waste gas stream in conduit 38.

TABLE II

Composition of waste stream from separator drum 36

| | Mol percent |
|---|---|
| $H_2$ | 0.34 |
| $CH_4$ | 5.90 |
| $C_2H_6$ | 44.52 |
| $C_3H_8$ | 43.62 |
| $C_4H_{10}$ and heavier | 5.08 |
| $H_2S$ | 0.54 |
| | 100.00 |

Separator drum 36 is operated at a temperature of $-200°$ F. and a pressure of 132 p.s.i.a.

From separator drum 36 the feed passes through conduit 39 to a heat exchanger 41. In exchanger 41 the feed is further cooled by indirect countercurrent heat exchange with hydrogen product streams. Additional cooling is attained in the warm end of exchanger 41 by the use of propane which has been used to absorb residual methane from the hydrogen product. In exchanger 41 the feed is cooled to a temperature of $-290°$ F. thereby condensing all the $C_2$ and heavier hydrocarbons and also a considerable amount of methane. The feed stream passes from exchanger 41 through conduit 42 to a separator drum 43 wherein the condensed hydrocarbons are separated. The hydrocarbons separated in separator drum 43 have a composition as shown in Table III and are withdrawn through conduit 44 and combined with the waste gas stream in conduit 38.

TABLE III

Composition of waste stream from separator drum 43

| | Mol percent |
|---|---|
| $H_2$ | 0.25 |
| $CH_4$ | 69.82 |
| $C_2H_6$ | 29.12 |
| $C_3H_8$ | 0.81 |
| | 100.00 |

Drum 43 is operated at a pressure of 131 p.s.i.a. and a temperature of $-290°$ F.

Following removal of the condensed hydrocarbons the feed stream, which now comprises 94.7 mol percent hydrogen product and 5.3 mol percent residual methane, passes through conduit 45 to an absorption tower 47. In absorption tower 47 the feed introduced through conduit 45 is countercurrently contacted with liquid propane introduced through conduit 48. Substantially all of the residual methane is absorbed by the liquid propane and 2,668 pounds per hour of hydrogen product comprising 99.95 mol percent hydrogen and 0.05 mol percent methane are withdrawn from absorption tower 47 through conduit 49. Absorption tower 47 is operated at a pressure of 130 p.s.i.a. with a bottom temperature of $-272°$ F. and a top temperature of $-289°$ F.

Hydrogen product in conduit 49 passes to a heat exchanger 51 where it is cooled to a temperature of $-295°$ F. by indirect contact with expanded hydrogen product and then passes through conduit 49 to heat exchanger 41 where it passes through passageway 54 and supplies cooling duty to the cold end of exchanger 41. From passageway 54 the hydrogen product passes through conduit 53 at a temperature of $-280°$ F., to expander 56. In expander 56 the hydrogen product is expanded to a pressure of 62 p.s.i.a. and its temperature is lowered thereby to $-312°$ F.

Expanded hydrogen product passes through expander 56 through conduit 57 to heat exchanger 58 where it is used to indirectly cool propane to a suitable temperature for use in absorption tower 47. From exchanger 58 the hydrogen product continues through conduit 57 at a temperature of $-295°$ F., and enters heat exchanger 59. In exchanger 59 the hydrogen product is passed in indirect countercurrent heat exchange with warmer propane whereby the propane is cooled. In addition, material from absorption tower 47 is withdrawn through conduit 61 at a temperature of $-275°$ F., and is passed through a separate passageway in the cold end of exchanger 59 whereby its temperature is lowered to $-281°$ F., by indirect countercurrent heat exchange with the hydrogen product. This material is then returned to absorption tower 47 through conduit 62. By withdrawing material from absorption tower 47, cooling it in exchanger 59 and then returning it to the absorption tower, it is possible to decrease the overall temperature rise in the absorption tower. This decreases the flow rate of propane required which in turn decreases the amount of the hydrogen product which must be used to strip absorbed methane from the propane. Since as explained below, the hydrogen product which is used to strip the propane is subsequently discarded as waste gas, this intercooling of the material in absorption tower 47 results in a greater yield of hydrogen product.

Hydrogen product leaves exchanger 59 through conduit 63 at a temperature of $-268°$ F. and passes to expander 64 in which it is expanded to a pressure of 27 p.s.i.a. with a corresponding temperature drop to $-306°$ F. From expander 64 the hydrogen product passes through conduit 65 to heat exchanger 51 where it is indirectly contacted with the hydrogen product in conduit 49. In this way the hydrogen product in conduit 49 is cooled to a sufficiently low temperature so that it may be utilized in the cold end of exchanger 41 to cool the feed stream to a temperature below the temperature at which the hydrogen product is withdrawn from absorption tower 47. From exchanger 51 the hydrogen product in conduit 65 continues at a temperature of $-300°$ F., to exchanger 41 where it is again used to cool the feed stream. By expanding the hydrogen product following its first use in exchanger 41 and then using the expanded hydrogen to supply further cooling duty in exchanger 41, it is possible to cool the feed to a much lower temperature than would otherwise be possible. Furthermore, by using the expanded hydrogen in conduit 65 to cool the hydrogen in conduit 49, before the hydrogen in conduit 49 enters exchanger 41, it is possible to use the hydrogen in conduit 49 to cool the feed to a lower temperature than the temperature at which the hydrogen product is withdrawn from the absorption zone. At the same time, the hydrogen in conduit 65 remains sufficiently cold so that it may be used for the same purpose.

The hydrogen product which enters exchanger 41 through conduit 65, is withdrawn through conduit 67. Part of this product is diverted through conduit 68 at the rate of 459 pounds per hour to be used in stripping absorbed methane from the propane. The remainder of the hydrogen product from conduit 67 passes through conduit 69 at a temperature of $-223°$ F., and a pressure of 26.8 p.s.i.a. to exchanger 33.

In exchanger 33 the hydrogen product is passed in indirect countercurrent heat exchange with the feed stream as a result of which its temperature is raised to $-86°$ F. From exchanger 33 the hydrogen product passes through conduit 71 to heat exchanger 72. In exchanger 72 the cold hydrogen product stream and the cold waste gas stream are both warmed by indirect countercurrent heat exchange with warm hydrogen product. The hydrogen product stream which entered exchanger 72 through conduit 71 leaves exchanger 72 at a temperature of $-63°$ F. and passes through conduit 23 to passageway 32 in heat exchanger 13. In exchanger 13 the hydrogen product is contacted in indirect countercurrent heat exchange with the incoming feed stream. The hydrogen product passes through passageway 32 continuously while the feed and waste gas streams alternate between passageways 29 and 31 as previously explained. The hydrogen product passes from passageway 32 through conduit 24 at a temperature of 92° F., to heat exchanger 72 where it is passed in indirect countercurrent heat exchange with cold hydrogen product and waste gas streams as previously discussed. From exchanger 72, the hydrogen product passes through conduit 73 at a temperature of 56° F., and a pressure of 20.0 p.s.i.a. to compressor 74 in which it is compressed to a pressure of 135 p.s.i.a. The hydrogen product is then recovered from the system at the rate of 2,209 pounds per hour through conduit 76 at a temperature of 100° F., as the product of the process. The hydrogen product may, of course, be recovered without compression, if desired, without departing from the scope of our invention.

That portion of the hydrogen product which is diverted through conduit 68 to be used to strip absorbed methane from the propane passes through conduit 68 to the lower portion of a stripping tower 77. In stripping tower 77 the hydrogen passes in countercurrent contact with the propane and thereby absorbs methane from the propane. The hydrogen-methane mixture is then withdrawn from the upper portion of stripping tower 77 as waste gas at the rate of 1,629 pounds per hour through conduit 38. The waste gas in conduit 38 is combined with condensed hydrocarbons from conduits 44 and 37 and combined waste gas stream passes from conduit 38 to heat exchanger 33. In exchanger 33 the waste gas stream is passed in indirect countercurrent heat exchange with the feed stream and then passes through conduit 78 at a temperature of $-86°$ F., to heat exchanger 72 where it is warmed to a temperature of $-63°$ F., by indirect countercurrent heat exchange with warm hydrogen product. Exchanger 72 is utilized to warm the cold waste gas and hydrogen product streams in order to reduce the temperature difference experienced in exchanger 13. If the cold waste gas were allowed to enter exchanger 13 without being first warmed in exchanger 72, the result would be that the waste gas stream would not be able to remove the ice deposits in the reversing passageways of exchanger 13 as rapidly as they were formed. By the use of exchanger 72 it is possible to maintain the temperature difference in exchanger 13 sufficiently low and at the same time maintain the temperature of the waste gas in exchanger 13 sufficiently high so that efficient removal of the ice deposits may be accomplished. From exchanger 72, the waste gas stream passes through conduit 26 and conduit 22 to passageway 31 of heat exchanger 13. From exchanger 13, the waste gas passes through conduit 16 and valve 12 and is withdrawn from the system through conduit 79 at the rate of 7,831 pounds per hour at a temperature of 92° F., and a pressure of 18.5 p.s.i.a. The waste gas withdrawn from the system has the composition shown in Table IV.

TABLE IV

Composition of waste gas

| | Mol percent |
|---|---|
| $H_2$ | 46.7 |
| $CH_4$ | 20.5 |
| $C_2$ hydrocarbons | 15.3 |
| $C_3$ hydrocarbons | 13.5 |
| $C_4$ and heavier hydrocarbons | 1.5 |
| $H_2S$ | 0.2 |
| $H_2O$ | 2.3 |
| | 100.0 |

When exchanger 13 is reversed, the waste gas instead of flowing through passageway 31 goes through conduits 26, 27 and 21 to passageway 29 and is withdrawn through conduit 14. In either case, the waste gas, by passing through the passageway of exchanger 13 which was used in the previous cycle to cool the incoming feed, is able to remove the deposits of ice formed during the cooling of the feed stream and the water thus formed is removed with the waste gas, as shown in Table IV.

Exchangers 33 and 41 can, of course, be omitted from the system shown without departing from the scope of our invention. Their use is preferred, however, because it reduces the amount of heat exchange duty to be performed by exchanger 32.

The propane which was used to absorb methane from the hydrogen in absorption tower 47 is withdrawn from the lower portion of absorption tower 47 through conduit 81 and passes to heat exchanger 82 where it is indirectly contacted with warmer propane thereby raising its temperature to $-250°$ F. From exchanger 82 the propane containing absorbed methane passes through conduit 83 to exchanger 41 where its temperature is further raised by indirect countercurrent contact with the feed stream. From exchanger 41 the propane passes through conduit 84 to exchanger 33 where it is further warmed by indirect countercurrent heat exchange with the feed stream. From exchanger 33 the propane passes through conduit 86 at a temperature of $-207°$ F., to the upper portion of stripping tower 77. In stripping tower 77 methane is removed from the propane by countercurrent contact with a portion of hydrogen product. Stripping tower 77 is operated at a pressure of 23 p.s.i.a. with a bottoms temperature of $-238°$ F. and a temperature in its upper portion of $-228°$ F. From the bottom of stripping tower 77, 15,200 pounds per hour of propane which is relatively free of methane is withdrawn through conduit 87. Makeup propane can be added through conduit 88 if needed. The propane in conduit 87 passes to heat exchanger 82 by means of pump 89. In exchanger 82, the propane from conduit 87 is cooled to a temperature of −263° F., by indirect heat exchange with propane-containing absorbed methane and is then passed through conduit 91 to exchanger 59. In exchanger 59, the propane is further cooled to a temperature of −281° F., and then passes through conduit 92 to exchanger 58. In exchanger 58, the propane is cooled to a temperature of −298° F., by indirect contact with cold expanded hydrogen product and is then passed through conduit 48 to the upper part of absorption tower 47 where it is again used to absorb methane from the hydrogen product.

Although our invention has been described with particular reference to the preferred embodiment described above, it will be appreciated that other embodiments, alterations or modifications can be employed without departing from the scope of our invention.

We claim:

1. The process for cooling a first fluid stream which comprises passing a cooled second stream at a pre-expansion pressure in indirect heat exchange with said first stream thereby cooling same, thereafter expanding said second stream thereby cooling the same and passing said second stream at a post-expansion pressure in indirect heat exchange with said second stream at said pre-expansion pressure thereby cooling without substantially condensing said second stream at said pre-expansion pressure for its initial heat exchange with said first fluid stream and maintaining the composition of said second stream at said pre-expansion pressure and said second stream at said post-expansion pressure substantially constant.

2. The process for cooling a first fluid stream which comprises passing a cooled second stream at a pre-expansion pressure in indirect heat exchange with said first stream thereby cooling the same, thereafter expanding said second stream thereby cooling the same and passing said second stream at a post-expansion pressure in indirect heat exchange with said second stream at said pre-expansion pressure thereby cooling without substantially condensing said second stream at said pre-expansion pressure for its initial heat exchange with said first fluid stream, then passing said expanded second stream in indirect heat exchange with said first stream and maintaining the composition of said second stream at said pre-expansion pressure and said second stream at said post-expansion pressure substantially constant.

3. The process according to claim 2 in which the first gaseous stream is partially condensed by the cooling process.

4. The process of claim 3 in which the first gaseous stream comprises hydrogen and methane and the second gaseous stream comprises hydrogen.

5. In a process for the recovery of hydrogen from a mixture containing hydrogen and methane in which said mixture is cooled thereby condensing methane, hydrogen contaminated with residual methane is separated and withdrawn, methane is removed from the separated hydrogen by countercurrently contacting said separated hydrogen with a scrubbing liquid in a scrubbing zone and purified hydrogen is recovered as a product of the process, the method for cooling said mixture to about the temperature at which said purified hydrogen is withdrawn from said scrubbing zone which comprises first cooling a stream of said purified hydrogen, then passing said cooled stream of purified hydrogen in indirect heat exchange with said mixture containing hydrogen and methane, thereafter expanding said stream of purified hydrogen thereby cooling the same, passing the thus expanded stream of purified hydrogen in indirect heat exchange with said stream of purified hydrogen prior to expansion for the initial cooling of the same, then passing said expanded stream of purified hydrogen in indirect heat exchange with said mixture containing hydrogen and methane and maintaining the composition of said stream of purified hydrogen prior to expansion and said expanded stream of purified hydrogen substantially constant.

References Cited in the file of this patent

UNITED STATES PATENTS

| | | |
|---|---|---|
| 1,511,800 | Claude | Oct. 14, 1924 |
| 1,579,348 | Claude | Apr. 6, 1926 |
| 1,605,646 | Claude | Nov. 2, 1926 |
| 1,620,192 | Claude | Mar. 8, 1927 |
| 2,495,549 | Roberts | Jan. 24, 1950 |
| 2,529,312 | Rupp | Nov. 7, 1950 |
| 2,530,602 | Dennis | Nov. 21, 1950 |
| 2,535,148 | Martin | Dec. 26, 1950 |
| 2,557,171 | Bodle | June 19, 1951 |
| 2,583,090 | Cost | Jan. 22, 1952 |
| 2,658,360 | Miller | Nov. 10, 1953 |
| 2,677,945 | Miller | Mar. 11, 1954 |
| 2,713,781 | Williams | July 26, 1955 |
| 2,765,635 | Redcay | Oct. 9, 1956 |
| 2,804,488 | Cobb | Aug. 27, 1957 |